United States Patent
Bahnmaier et al.

(10) Patent No.: US 7,322,611 B2
(45) Date of Patent: Jan. 29, 2008

(54) BELT-DEFLECTING DEVICE FOR A SEAT BELT

(75) Inventors: Albert Bahnmaier, Illerkirchberg (DE); Jurgen Mautsch, Dietenheim (DE); Markus Lindau, Altenstadt (DE); Oliver Glinka, Ulm (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 255 days.

(21) Appl. No.: 10/954,950

(22) Filed: Oct. 1, 2004

(65) Prior Publication Data
US 2005/0104358 A1 May 19, 2005

(30) Foreign Application Priority Data
Oct. 1, 2003 (DE) .................. 103 46 172

(51) Int. Cl.
*B60R 22/20* (2006.01)
(52) U.S. Cl. ..................................... 280/808
(58) Field of Classification Search ............... 280/808; B60R 22/20
See application file for complete search history.

(56) References Cited

U.S. PATENT DOCUMENTS

| 4,093,274 A | * | 6/1978 | Scholz et al. ............... 280/807 |
| 4,147,387 A | | 4/1979 | Coenan |
| 4,351,545 A | * | 9/1982 | Cardew ....................... 280/806 |
| 5,139,282 A | | 8/1992 | Mein |
| 5,599,070 A | | 2/1997 | Pham et al. |
| 5,722,732 A | * | 3/1998 | Haldenwanger ............ 297/483 |
| 6,736,427 B2 | | 5/2004 | Herrmann et al. |
| 6,832,782 B2 | * | 12/2004 | Mori .......................... 280/806 |
| 7,004,503 B2 | * | 2/2006 | Herrmann et al. ........ 280/801.2 |
| 2003/0062714 A1 | * | 4/2003 | Herrmann et al. .......... 280/808 |
| 2004/0239094 A9 | * | 12/2004 | Herrmann et al. .......... 280/808 |

FOREIGN PATENT DOCUMENTS

| DE | 199 15 024 A1 | 10/2000 |
| DE | 101 03 319 A1 | 8/2002 |
| GB | 2 348 402 A1 | 10/2000 |

* cited by examiner

*Primary Examiner*—Paul N. Dickson
*Assistant Examiner*—Leonard McCreary, Jr.
(74) *Attorney, Agent, or Firm*—Foley & Lardner LLP

(57) ABSTRACT

A seat belt-deflecting device which has a simple and cost-effective construction. The deflecting device includes at least one holding body on which a deflecting element is held. The seat belt is deflected about the deflecting axis of the deflecting element. The deflecting device also includes a belt-deflecting edge which is formed by the shaping of the holding body and about which the seat belt of the motor vehicle is additionally deflected in the direction of the vehicle occupant. The deflecting axis of the deflecting element and the deflecting edge forming an acute angle with respect to each other.

16 Claims, 3 Drawing Sheets

BELT-DEFLECTING DEVICE FOR A SEAT BELT

BACKGROUND

The invention relates to a device for a seat belt.

German patent application DE 101 03 319 A1 (incorporated by reference herein) describes a belt-deflecting device with an energy absorption unit. If, in the event of a vehicle accident, the seat belt is deflected by the vehicle occupant, a considerable tensile force is exerted on the deflecting device. In order to limit the restraining forces acting on the vehicle occupant, in the case of the previously known belt-deflecting device, the energy absorption unit is configured so that it permits the seat belt to yield; this takes places specifically so that a deflecting element of the belt-deflecting device is displaced or moved in such a manner by deformation of the holding elements holding the deflecting element that an "extension of the belt" for the vehicle occupant occurs. In order to make the described absorption of energy possible, the previously known belt-deflecting device is of multi-part construction.

U.S. Pat. No. 5,139,282 (incorporated by reference herein) describes a belt-deflecting device having a deflecting element which is fastened pivotably or rotatably to the vehicle bodywork by means of a screw. The deflecting element is assigned a spring element which exerts on the seat belt a predetermined prestressing force which presses the seat belt against the vehicle occupant. Owing to the pivotable mounting of the deflecting element on the vehicle bodywork, the deflecting element can rotate or pivot when the vehicle occupant moves, which means that the position of the seatbelt relative to the vehicle occupant may change. In the case of a vehicle accident, this simultaneous pivoting of the deflecting element may be disadvantageous because, when a critical pivoting angle is reached, the seat belt may become jammed or twisted on the deflecting element. The functioning of the seat belt may be impaired as a result.

SUMMARY

According to an embodiment of the invention a seat belt-deflecting device is provided which has a simple and therefore cost-effective construction.

According to an embodiment of the present invention, a a belt-deflecting device for a seat belt, in which device a single-piece holding body is present is provided. The single-piece holding body has at least one holding point on which a deflecting element is held; the deflecting element forms a deflecting axis about which the seat belt of the motor vehicle is deflected. In addition, the holding body is shaped according to the invention so that it forms a belt-deflecting edge about which the seat belt of the motor vehicle is deflected a further time, i.e. additionally. In this case, the deflecting edge of the holding body is at an acute angle with respect to the deflecting axis of the deflecting element. In addition, the holding body according to the invention has at least one fastening point which permits a rigid installation of the holding body on the motor vehicle bodywork.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
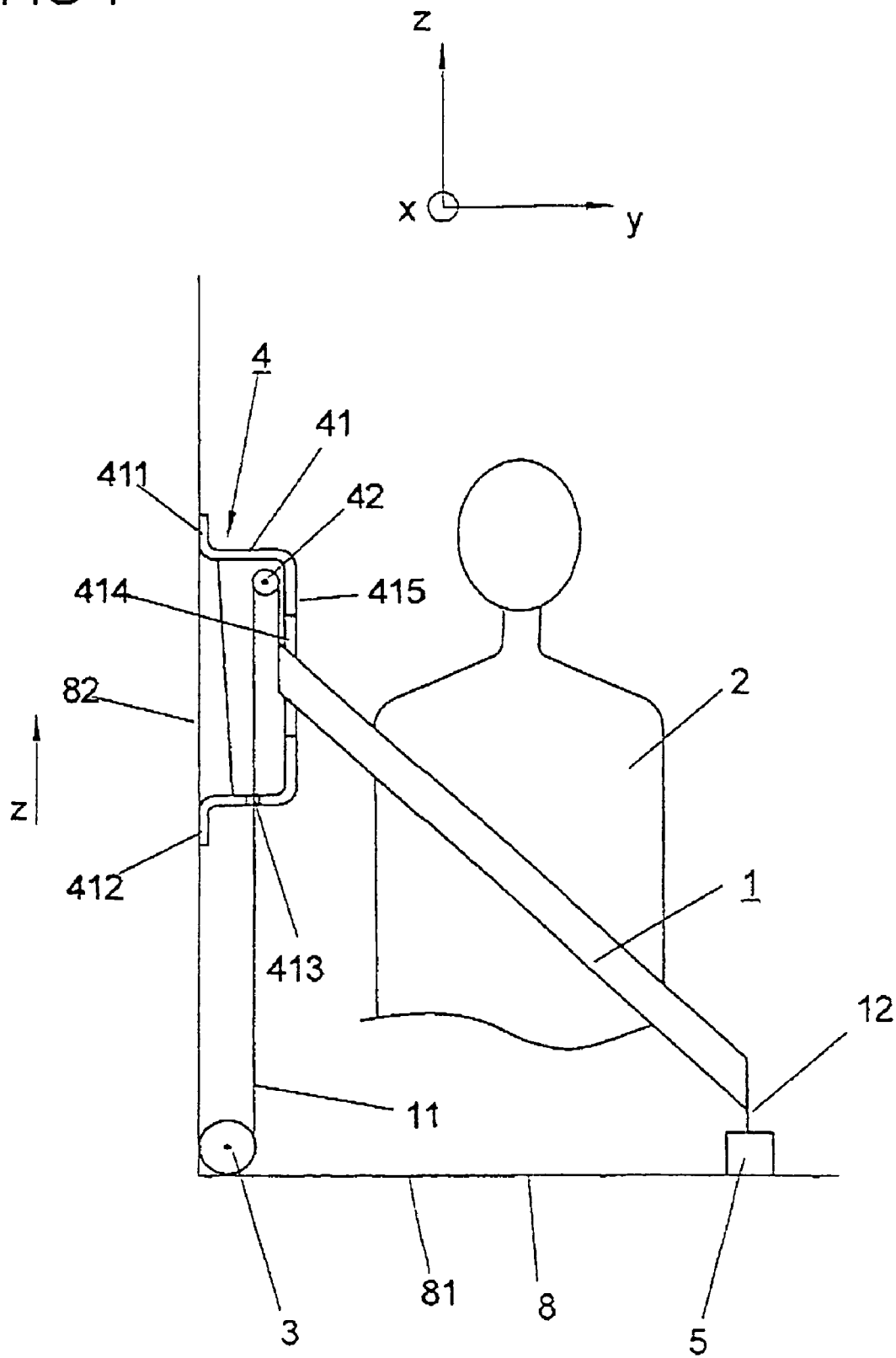
FIG. 1 shows a seat belt device with an exemplary embodiment for a belt-deflecting device.

FIG. 1 shows a seat belt device having a seat belt 1 for a vehicle occupant 2.

The belt 1 is rolled up by its one belt end 11 on a belt roller 3. The belt roller 3 is connected fixedly to the bodywork 8 in the bottom region 81 of the vehicle bodywork 8. The belt roller 3 has a torque-generating mechanism which is prestressed in the winding-up direction of the belt and tightens the seat belt 1. In addition, the belt roller 3 has an unwinding-blocking arrangement which, upon an attempted, rapid extension of the seat belt 1 and/or upon an accident-induced acceleration of the unwinding of the seat belt, blocks the seat belt 1 counter to the force of the torque-generating mechanism.

The seat belt 1 extends from its end 11 which is connected to the belt roller 3 via a belt-deflecting device 4 to a belt buckle 5, on which the other end 12 of the seat belt is releasably fixed or held.

The belt-deflecting device 4 has a single-piece holding body 41 which is fastened rigidly to the vehicle bodywork 8 in the region of the B-pillar 82 at an upper fastening point 411 and at a lower fastening point 412. In this case, the fastening height of the belt-deflecting device 4 and of the single-piece holding body 41 is safeguarded so that the seat belt 1 is deflected approximately at shoulder height of the vehicle occupant 2.

The seat belt 1 extends upwards from its one end 11 along the B-pillar 82 in the Z-direction of the vehicle and passes through a belt-introducing slot 413 into the belt-deflecting device 4. The seat belt 1 is deflected in such a manner by an upper deflecting element 42 of the belt-deflecting device 4 that it now runs virtually vertically downwards again counter to the Z-direction of the vehicle. The seat belt 1 leaves the belt-deflecting device 4 through a belt outlet slot 414 of the single-piece holding body 41 and is guided to the belt buckle 5 over the shoulder and chest region of the vehicle occupant 2.

As can be seen in FIG. 1, the belt outlet slot 414 is configured so that the seat belt 1 is tilted in the chest region of the vehicle occupant 2 by approx. 20° to 70°, so that the seat belt 1 rests in an optimum position on the vehicle occupant 2.

As can also be gathered from FIG. 1, a central region 415 of the holding body 41 is arranged slightly spaced apart from the B-pillar 81 of the vehicle bodywork 8; this is specifically achieved by the two fastening points 411 and 412 which are mounted on the holding body 41 so that the central region 415 is at a predetermined distance Δx from the B-pillar 81.

The distance Δx between the central region 415 and the B-pillar 81 of the vehicle comes into effect in the event of a vehicle accident. If, namely, in the event of a vehicle accident the head of the vehicle occupant 2 is hurled against the belt-deflecting device 4 or against the holding body 41, the central region 415 of the holding body 41 can slightly yield, since it can be deformed in the direction of the B-pillar 82 of the vehicle on account of the distance Δx. A fatal impact of the head of the vehicle occupant 2 against the belt-deflecting device 4 can therefore be prevented.

Figure 2:
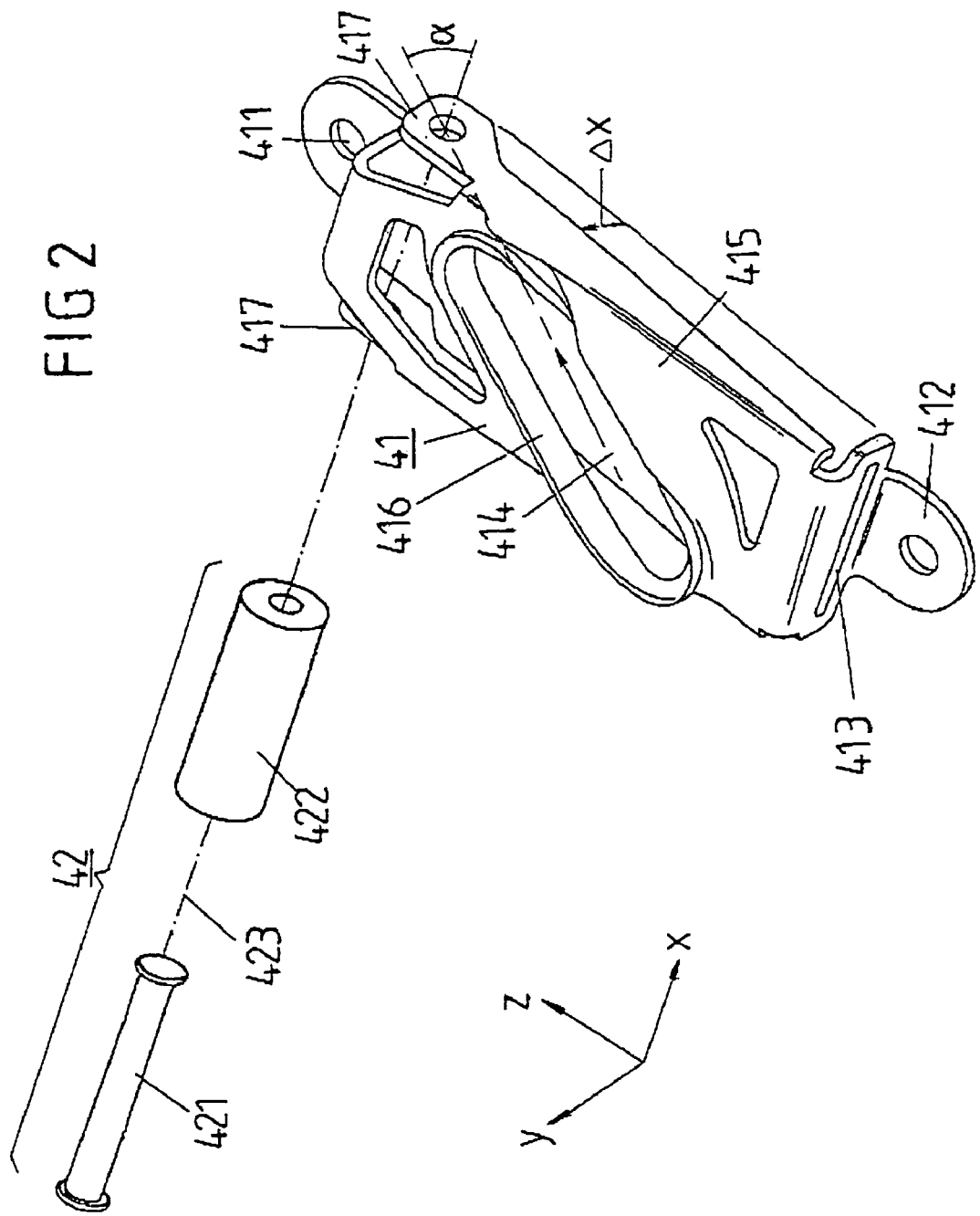
FIG. 2 shows the exemplary embodiment for the belt-deflecting device according to FIG. 1 in detail in the disassembled state or prior to installation.
Figure 3:
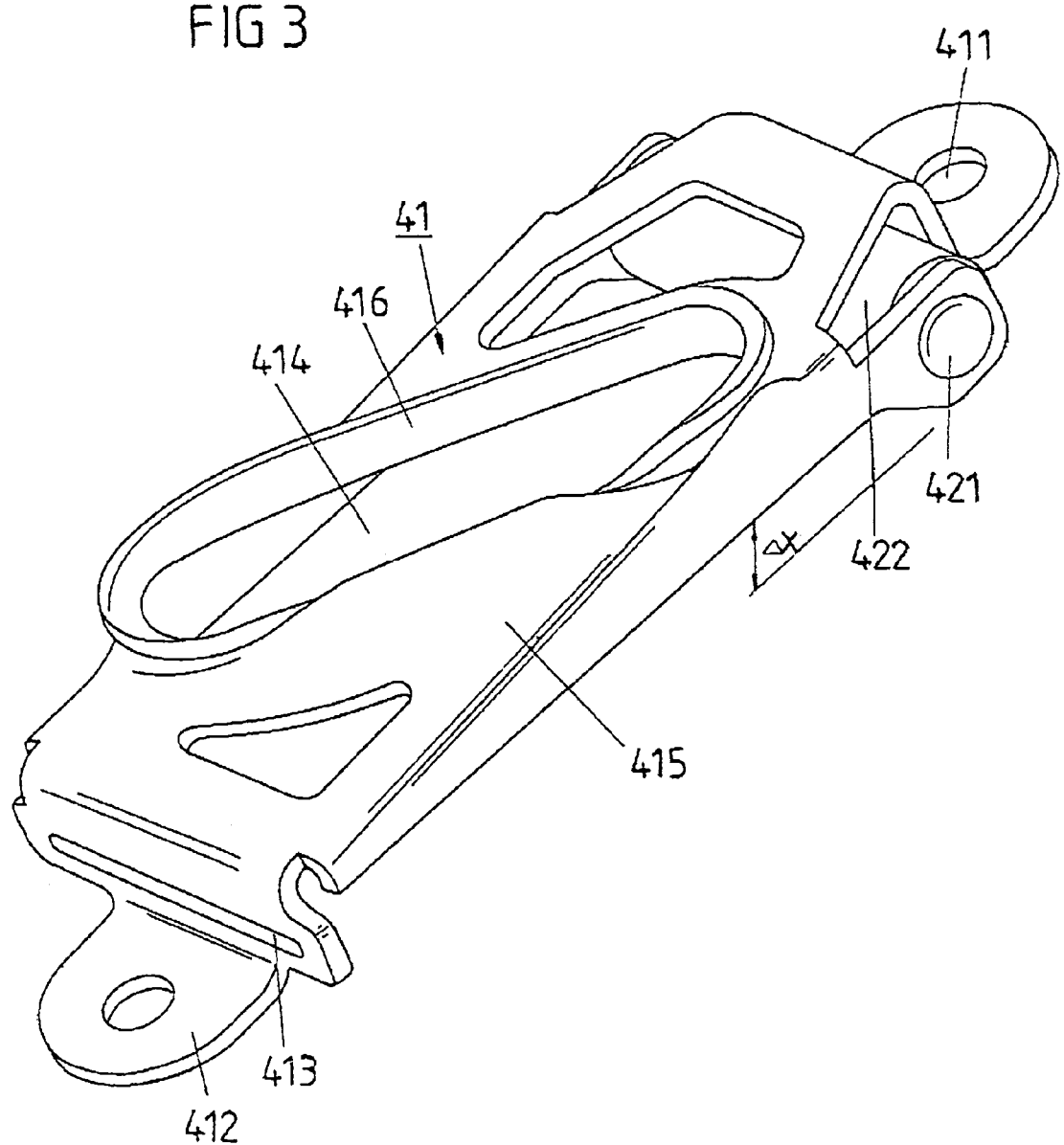
FIG. 3 shows the belt-deflecting device according to FIGS. 1 and 2 in the assembled state.

FIG. 2 shows the belt-deflecting device 4 according to FIG. 1 in detail—in the state in which it is still not fitted. The holding body 41 with its upper fastening point 411 and with its lower fastening point 412 can be seen. In the exemplary embodiment according to FIGS. 1 to 3, the two fastening points 411 and 412 are formed in each case by eyes. As an alternative, one of the two fastening points or else both can be formed by hooks or fastening flanges. For example, the upper fastening point 411 can be formed by the eye shown in FIG. 2 whereas the lower fastening point 412 is replaced by two fastening hooks.

FIG. 2 also shows the distance Δx between the central region 415 and that fastening surface of the holding body 41 which is formed by the two fastening points 411 and 412 on the B-pillar 81 of the motor vehicle bodywork 8.

In addition, the belt-introducing slot 413 and the belt outlet slot 414, which are in each case produced by punching them out in the holding body formed by an integral punched and bent part of sheet metal, can be seen in FIG. 2. In this case, the belt outlet slot 414 has a crimped or rounded edge which forms a deflecting edge 416 of the belt outlet slot 414. The effect which can be achieved by crimping the punched-in belt outlet slot 414 is that the friction between the holding body 41 and the seat belt 1 is minimized. In addition, damage to the seat belt 1 is avoided.

The upper deflecting element 42 which is formed by a steel pin 421 and a deflecting roller 422 can also be seen in FIG. 2. The steel pin 421 is held along its deflecting axis 423 at two holding points 417 of the holding body 41. The deflecting roller 422 is mounted rotatably on the steel pin 421, so that the deflecting roller 422 can be rotated with very little friction on the steel pin 421.

It can also be gathered from FIG. 2 that the deflecting edge 416 of the belt outlet slot 414 and the deflecting axis 423 of the upper deflecting element 42 form an angle α. The angle α can lie in a range between 30° and 70°, for example even in a range between 35° and 55°. In the exemplary embodiment according to FIG. 2, the angle is approx. 45°.

In contrast, the belt-introducing slot 413 and the deflecting axis 423 are aligned largely parallel to each other.

The holding body 41 is—as already explained—of single-piece design; this means that the two fastening points 411 and 412, the two holding points 417, the belt-introducing slot 413 and the belt outlet slot 414 are formed as a single piece. The holding body 41 can be formed, for example, by punching and bending a metal sheet, for example a steel sheet. As an alternative, the holding body 41 may also be formed by injection molding from plastic or by diecasting of aluminum. In order to permit a simple and cost-effective production of the holding body, it is merely advantageous if the holding body is of single-piece design—as illustrated.

In the exemplary embodiment according to FIG. 2, the upper deflecting element 42 is formed by the steel pin 421 and the deflecting roller 422. As an alternative, it is also conceivable to form the upper deflecting element 42 by a deflecting bar, by a deflecting sheet-metal part or the like. The deflecting bar or the deflecting sheet-metal part are then preferably formed as a single piece on the holding body 41.

FIG. 3 once again shows the holding body 41 according to FIG. 2 in the assembled state. The deflecting roller 422 which is mounted on the steel pin 421 can be seen. In this case, the steel pin 421 is fixed in the two holding points 417 of the holding body 41.

One advantage of the belt-deflecting device according to an embodiment of the present invention resides in the fact that it ensures a reliable "functioning" of the seat belt even in the event of a vehicle accident; in particular, a jamming or twisting or "turning over" of the seat belt on the deflecting element of the belt-deflecting device cannot occur. This is achieved by the deflecting element being held by the single-piece holding body which itself is fitted rigidly on the motor vehicle bodywork. As a result, a pivoting or a twisting of the deflecting element relative to the bodywork cannot occur.

The same applies to the belt-deflecting edge which additionally deflects the seat belt of the motor vehicle in the direction of the vehicle occupant. The belt-deflecting edge is formed by the shaping of the holding body which—as already described—is fastened rigidly to the bodywork. In summary, an increased safety is provided to the vehicle occupant n because a pivoting or a twisting of the holding body bringing about the deflection of the seat belt is reliably prevented owing to the rigid installation on the motor vehicle bodywork.

Another advantage of the belt-deflecting device according to at least one embodiment of the invention resides in its cost-effective construction. The "central" holding body of the belt-deflecting device, which provides all of the essential functions of the belt-deflecting device, is of single-piece design. As a result, additional installation steps—with respect to the holding body are superfluous, as a result of which the entire installation of the belt-deflecting device is kept simple and cost-effective.

Yet another advantage of at least one embodiment of the invention, results from the provision of the two separate "deflecting devices", namely the deflecting element and the deflecting edge. When the deflecting edge is arranged at an acute angle with respect to the deflecting axis of the deflecting element, it is ensured that, despite the rigid installation of the holding body on the bodywork the seat belt is always optimally aligned with respect to the vehicle occupant. On the contrary, the abovementioned U.S. patent discloses an arrangement that provides a non-"trackable" alignment of the deflecting axis of the deflecting element, As described above according to an embodiment of the present invention, the seat belt, after the deflection in the direction of the vehicle occupant, is "tilted" so that a twisting or turning over of the seat belt in the belt-deflecting device is reliably avoided even in the event of a vehicle accident.

The single-piece holding body of the belt-deflecting device can be fastened in a particularly simple and therefore advantageous manner to the motor vehicle bodywork if the fastening point or the fastening points is/are formed by eyes, hooks or flanges.

The single-piece holding body preferably has at least two fastening points arranged at a distance from each other or "spaced apart"; the fastening points are integrally formed on the holding body so that the remaining region of the holding body—that is, for example, the central region between the fastening points—is, at least in part, at a predetermined distance from the bodywork after the installation of the holding body on the bodywork. In other words, by means of the at least two fastening points arranged spaced apart, a type of "bridge" is therefore formed by the holding body. The central bridge region, which is at a distance from the bodywork, therefore forms a "deformation region" which can absorb energy in the y-direction of the motor vehicle. If the belt-deflecting device is mounted, for example, in the region of the B-pillar of a motor vehicle, then it is generally situated at shoulder or head height of the motor vehicle occupant. In the event of a vehicle accident, the "bridge construction" permits the central region of the single-piece holding body to yield, since the central region or central bridge region can be pressed onto the bodywork by deformation of the holding body. This deformation "converts" kinetic energy providing a dampening effect to the impacting object. In order to be able to ensure this absorption of energy, the central region between the fastening points can be at least slightly deformed, preferably in the Y-direction or in the direction of the bodywork.

In order to avoid the seat belt from becoming prematurely "worn" when deflected on the deflecting edge of the holding body, the belt-deflecting edge which is formed by the shaping of the holding body is rounded preferably at least in the region interacting with the seat belt, with the result that the friction between the belt-deflecting edge and the seat belt is minimized. The rounding of the deflecting edge can take place, for example, by "crimping" or direct "shaping".

In a simple manner, the belt-deflecting edge can be formed by a longitudinal edge of an opening slot or of a belt outlet slot in the holding body. For the reasons mentioned, this belt outlet slot should be crimped, at least in its region interacting with the seat belt, in order to keep the friction between the seat belt and the belt-deflecting edge as low as possible.

In addition, it is regarded as advantageous if the acute angle between the deflecting axis of the deflecting element and the belt-deflecting edge lies in the range between 20° and 70°, since a particularly good alignment of the seat belt relative to the vehicle occupant is ensured with such a choice of angle. An angular range between 35° and 55° is particularly preferred, since such an angular range ensures an optimum relative position or alignment of the seat belt relative to the vehicle occupant in most models of motor vehicles. The acute angle may be, for example, approximately 45°.

The deflecting element can be formed in a simple manner, for example, by a deflecting roller which is mounted rotatably and is fastened to the holding body, designed as a single piece, by means of a pin. The pin may be, for example, a metal pin, in particular a steel pin.

In order to ensure a reliable fastening of the deflecting roller to the holding body even in the case of the large forces occurring in the event of a vehicle accident, it is regarded as advantageous if the pin is held at at least two holding points formed on the holding body. The pin may, for example, also be mounted rotatably in the holding points.

As an alternative to a rotatably mounted deflecting roller, the deflecting element may also be formed by a deflecting bar which is integrally formed as a single piece on the holding body. Similarly, the deflecting element may also be realized by a further deflecting edge formed as a single piece on the holding body. The advantage of a deflecting bar or of a further deflecting edge resides in the fact that this can already be simultaneously produced with the production of the single-piece holding body, with the result that an additional installation of a pin and a deflecting roller is avoided. In certain situations the deflecting roller may be preferred in order to limit frictional forces on the belt.

In order to ensure that the seat belt is reliably guided in the holding body, it is in addition regarded as advantageous if the holding body additionally has a belt-introducing slot which is preferably arranged parallel to the deflecting axis of the deflecting element. The seat belt is then introduced through the belt-introducing slot into the region of the holding body and is guided from the belt-introducing slot to the deflecting element; the seat belt is deflected by the deflecting element in the direction of the belt-deflecting edge. The seat belt is subsequently deflected a further time in the direction of the vehicle occupant by the belt-deflecting edge, with the result that the seat belt again leaves the region of the holding body.

According to yet another embodiment of the present invention, provision is made for the single-piece holding body to be formed by a punched and bent part, for example by a punched and bent part made of sheet metal. The single-piece holding body can be produced in a particularly simple and therefore cost-effective manner by punching and bending.

In addition, the belt outlet slot explained above is also preferably formed by punching it out from the punched and bent part or from the sheet-metal part. The fastening points are then preferably formed by a bending away of edge regions, specifically in the installation direction towards the vehicle bodywork. In a corresponding manner, the belt-introducing slot is preferably also punched into the single-piece holding body.

Instead of a punched and bent part, the single-piece holding body may also be formed by a plastic injection-molded part or by an aluminum cast part.

In addition, according to another embodiment of the invention is a method for producing a belt deflecting device is provided. The method provides a simple and cost-effective manner for producing a belt-deflecting device for a seat belt of a motor vehicle.

This object is achieved according to the invention by a method for producing a belt-deflecting device, in which a single-piece holding body is formed by a sheet-metal part in which a belt outlet slot is punched into the central region of the sheet-metal part and/or fastening points are formed by bending away edge regions of the sheet-metal part and/or a belt-introducing slot is punched into the single-piece holding body.

In the method according to an embodiment of the invention, reference is made to the above details in conjunction with the belt-deflecting device, since these apply correspondingly to the method.

The priority application, German Patent Application No. DE 10346172 filed Oct. 1, 2003, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A belt-deflecting device, for a seat belt of a motor vehicle, comprising a single-piece holding body, and wherein the holding body comprises:
    a holding point on which a deflecting element is held, wherein the seat belt is deflected about the deflecting axis of the deflecting element;
    a belt-deflecting edge which is formed by the shaping of the holding body and about which the seat belt of the motor vehicle is additionally deflected in the direction of a vehicle occupant, wherein the deflecting axis of the deflecting element and the deflecting edge form an acute angle with respect to each other, wherein the single-piece holding body includes at least two fastening points arranged at a distance from each other, adapted to fasten the holding body at the bodywork, wherein the fastening points are integrally formed on the holding body so that a central region between the fastening points, is, at least in part, at a predetermined distance (Δx) from the bodywork after the installation of the holding body on the bodywork, and wherein the central region forms a bridge structure extending between the fastening points and wherein a longitudinal axis of the bridge structure is perpendicular to the deflecting axis of the deflecting element; and wherein the bridge structure is configured to be deformed in the direction of the bodywork perpendicular to the longitudinal axis of the bridge structure and perpendicular to the deflecting axis of the deflecting element.

2. The device of claim 1, wherein the fastening point is formed by an eye, a hook or a flange.

3. The device of claim 1, wherein the belt-deflecting edge formed by the shaping of the holding body is rounded at least in the region which interacts with the seat belt.

4. The device of claim 3, wherein the rounded deflecting edge is crimped.

5. The device of claim 1, wherein the belt-deflecting edge formed by the shaping of the holding body is formed by a longitudinal edge of a belt outlet slot of the holding body.

6. The device of claim 5, wherein the belt outlet slot is rounded and crimped, at least in the region interacting with the seat belt.

7. The device of claim 1, wherein the acute angle (α) is between 20° and 70°.

8. The device of claim 1, wherein a deflecting element comprises a roller mounted rotatably on a pin.

9. The device of claim 8, wherein the pin is formed by a metal pin.

10. The device of claim 8, wherein the pin is mounted rotatably at two holding points formed on the holding body.

11. The device of claim 1, wherein the deflecting element comprises a deflecting bar integrally formed as a single piece on the holding body.

12. The device of claim 1, wherein the holding body includes a belt-introducing slot which is arranged parallel to the deflecting axis of the deflecting element.

13. The device of claim 12, wherein the belt-introducing slot is punched into the single-piece holding body.

14. The device of claim 1, wherein the single-piece holding body is formed by a punched and bent part.

15. The device of claim 14, wherein the holding body comprises sheet metal and wherein the belt outlet slot is punched into a central region of the holding body and the fastening point is formed by an edge region of the sheet-metal that are bent in the direction of the vehicle bodywork.

16. The device of claim 1, wherein the single-piece holding body is formed by an injection-moulded part or a metal cast part.

* * * * *